(12) United States Patent
Farhang-Boroujeny et al.

(10) Patent No.: US 7,634,012 B2
(45) Date of Patent: Dec. 15, 2009

(54) MULTI-CARRIER SPREAD SPECTRUM USING NON-LINEAR MODIFICATION OF SUB-CARRIER BANDS

(75) Inventors: Behrouz Farhang-Boroujeny, Salt Lake City, UT (US); Cynthia M. Furse, Salt Lake City, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 624 days.

(21) Appl. No.: 10/558,929

(22) PCT Filed: Jun. 9, 2004

(86) PCT No.: PCT/US2004/018453

§ 371 (c)(1),
(2), (4) Date: Nov. 29, 2005

(87) PCT Pub. No.: WO2005/002067

PCT Pub. Date: Jan. 6, 2005

(65) Prior Publication Data

US 2007/0064773 A1 Mar. 22, 2007

(51) Int. Cl.
*H04L 27/28* (2006.01)
(52) U.S. Cl. .................................................... 375/260
(58) Field of Classification Search ................ 375/260, 375/285, 345–346, 147–148; 370/208, 320, 370/335, 342
See application file for complete search history.

(56) References Cited

U.S. PATENT DOCUMENTS

| 5,521,937 | A | | 5/1996 | Kondo et al. | |
|---|---|---|---|---|---|
| 5,570,350 | A | * | 10/1996 | Myer et al. | 370/335 |
| 5,625,871 | A | * | 4/1997 | Myer et al. | 370/328 |
| 6,078,796 | A | | 6/2000 | Ling | |
| 6,097,712 | A | | 8/2000 | Secord et al. | |
| 6,324,171 | B1 | | 11/2001 | Lee et al. | |
| 6,359,923 | B1 | | 3/2002 | Agee et al. | |
| 6,480,528 | B1 | | 11/2002 | Patel et al. | |
| 6,507,585 | B1 | | 1/2003 | Dobson | |
| 6,980,614 | B2 | * | 12/2005 | Miller et al. | 375/347 |
| 7,403,559 | B1 | * | 7/2008 | Fisher et al. | 375/150 |
| 2002/0126618 | A1 | * | 9/2002 | Kim | 370/208 |
| 2004/0120274 | A1 | * | 6/2004 | Petre et al. | 370/320 |

OTHER PUBLICATIONS

Kondo, Shiro Performance of Multicarrier DS CDMA Systems, IEEE Transactions on Communications, Feb. 1996, 238-246, vol. 44, No. 2.

(Continued)

*Primary Examiner*—Khanh C Tran
(74) *Attorney, Agent, or Firm*—Kirton & McConkie; William T. Ralston (57) ABSTRACT

A multi-carrier spread spectrum (MC-SS) technique is disclosed which includes non-linearly modifying the sub-carriers in the receiver. A method (600) and receiver (200, 300) for processing an MC-SS signal, a transceiver for MC-SS communications (700), and an MC-SS radar (800) are describe.

27 Claims, 6 Drawing Sheets

OTHER PUBLICATIONS

Kaleh, Ghassan Kawas, Frequency-Diveristy Spread-Spectrum Communication System to Counter Bandlimited Gaussian Interference, IEEE Transactions on Communications, Jul. 1996, 886-893, vol. 44, No. 7.

Vandendorpe, L. Multiton Spread Spectrum Multiple Access Communications System in a Multipath Rician Fading Channel, IEEE Transactions on Vehicular Technology, May 1995, 327-337, vol. 44. No. 2.

Hara, Shinsuke overview of Multicarrier CDMA, IEEE Communications Magazine, Dec. 1997, 126-133.

Cheun, Kyungwhoon, Antijamming Performance of a Multicarrier Direct-Sequence Spread-Spectrum System, IEEE Transactions on Communications, Dec. 1999., 1781-1784, vol. 47. No. 12.

* cited by examiner

MULTI-CARRIER SPREAD SPECTRUM USING NON-LINEAR MODIFICATION OF SUB-CARRIER BANDS

BACKGROUND OF THE INVENTION

1. Field of the Invention

The present invention relates generally to multi-carrier spread spectrum communications.

2. Related Art

Spread spectrum (SS) systems have proven useful in a variety of applications, including wired and wireless communications, ranging, radar, and synchronization. All of these applications may suffer from interference that is ameliorated by the use of SS techniques. SS operates by greatly expanding the frequency spectrum of the information-containing signal. This expansion is controlled by a spreading code. For example, in direct sequence spread spectrum (DS-SS) the information signal is multiplied by a high rate spreading code. The high rate spreading code creates the wide bandwidth transmit signal. Multi-carrier spread spectrum (MC-SS) is an alternative to the conventional DS-SS and frequency hopping spread spectrum (FH-SS) techniques. MC-SS provides a number of distinct advantages over conventional SS. For example, U.S. Pat. No. 5,521,937 issued to Kondo et al. discloses a MC-SS system having resistance to multipath fading and narrow-band interference. MC-SS systems can also provide improved resistance to partial-band interference and jamming.

The improved performance of MC-SS over conventional SS is obtained by transmitting each symbol simultaneously across several sub-carrier bands, where the signal on each sub-carrier band is a conventional (although possibly lower bandwidth) spread spectrum signal. At the receiver, the signals from each sub-carrier band are processed and combined. It is difficult to combine the sub-carriers and maintain good performance, since the optimum weighting of the sub-carriers depends on the per sub-channel channel gain, interference/jamming statistics, and noise statistics. For example, U.S. Pat. No. 5,521,937 discloses a maximum ratio combiner (MRC). The MRC combines the sub-carriers by estimating the signal to noise ratio (SNR) on each sub-carrier band, linearly scaling the signal from each sub-carrier band proportionally to the SNR of that sub-carrier band, and then summing all the channels. The MRC combiner must, however, estimate the SNR for each sub-carrier band. Any errors in the estimate of the SNR result in degradation of performance relative to an optimal receiver. Accurate estimation of SNR has proven difficult to achieve in practical systems.

SUMMARY OF THE INVENTION

One embodiment of the invention includes a method for processing a spread spectrum signal. The spread spectrum signal includes a plurality of sub-carrier bands, where substantially similar information is encoded in each of the plurality of sub-carrier bands. The method may include receiving the spread spectrum signal at a receiver and demodulating the spread spectrum signal to recover the plurality of sub-carrier bands. The method may also include modifying the plurality of sub-carrier bands with a predetermined non-linear function to form a plurality of modified sub-carrier bands. By using the method, the need for estimating the SNR in the sub-carrier channels may be avoided.

Additional features and advantages of the invention will be apparent from the detailed description which follows, taken in conjunction with the accompanying drawings, which together illustrate, by way of example, features of the invention.

BRIEF DESCRIPTION OF THE DRAWINGS

The following drawings illustrate exemplary embodiments for carrying out the invention. Like reference numerals refer to like parts in different views or embodiments of the present invention in the drawings.

DETAILED DESCRIPTION

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

Figure 1:
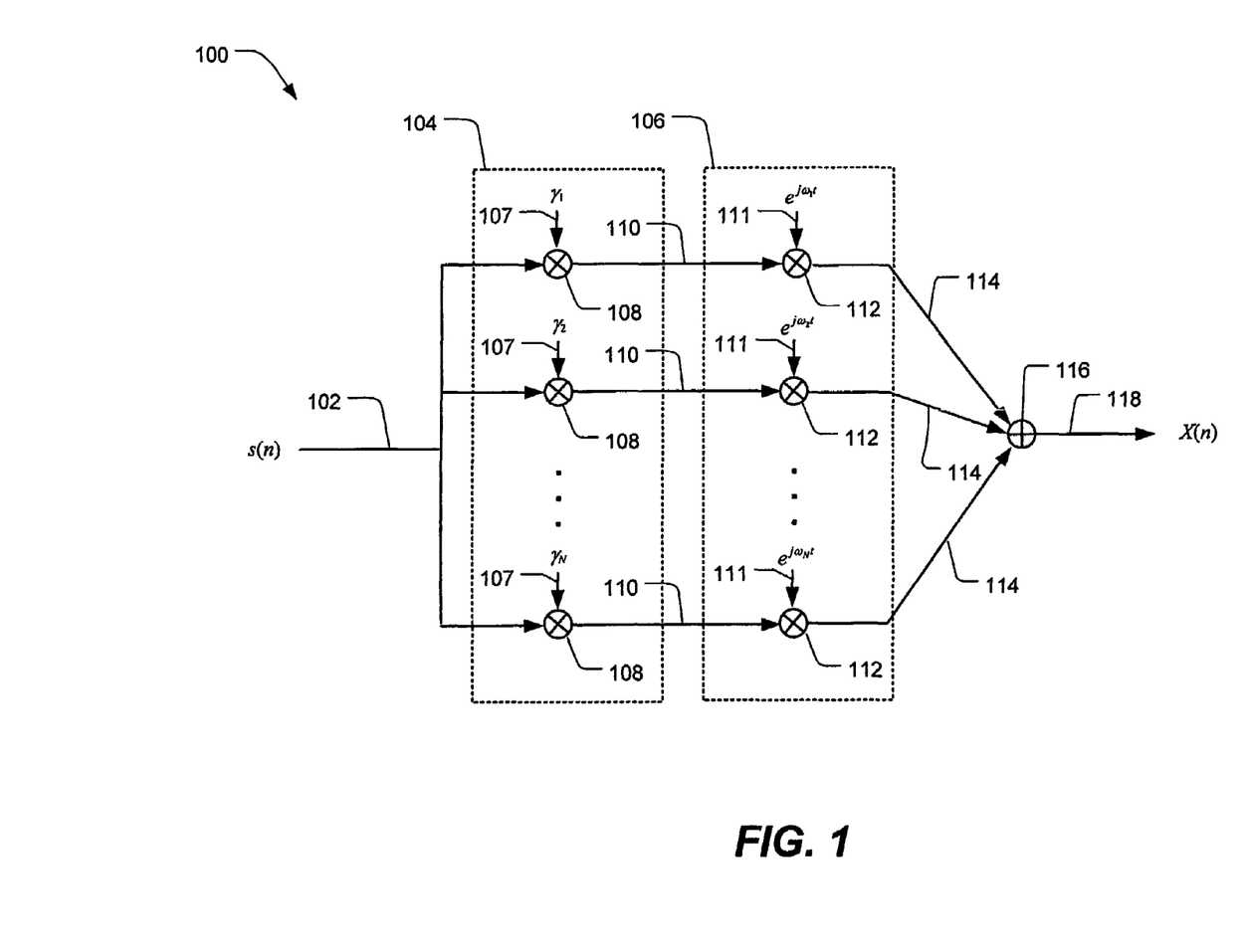
FIG. 1 is a schematic diagram of an embodiment of an MC-SS transmitter in accordance with the present invention.

FIG. 1 illustrates a schematic diagram of an embodiment of an MC-SS transmitter 100 in accordance with the present invention. The MC-SS transmitter 100 accepts information symbols 102 s(n), where n represents time. The symbols can optionally be forward error correction encoded user information: For example, forward error correction encoding may be applied to user information using a block, convolutional, or turbo code to generate the information symbols. When the information symbols have been forward error correction encoded, the information symbols may include both user information and redundancy added by the forward error correction coding process. In accordance with one embodiment of the present invention, as illustrated in FIG. 1, the information symbols may be applied to each of the sub-carriers. Alternately, different information symbols may be applied to each sub-carrier, where the information symbols have been generated from common user information, e.g. by applying different forward error correction encoding for each sub-channel. In either case, the sub-carriers will carry substantially similar information.

In accordance with another embodiment of the present invention, the information symbols 102 may be phase modulated, for example using M-ary phase shift keying as is known in the art.

The information symbols 102 are spread by a spreader 104, and modulated, by a modulator 106. The spreader may be implemented by multiplying each information symbol by spreading codes 107 ($\gamma_i$, i=1 ... N, where N is the number of sub-carriers) using multipliers 108 to produce spread symbols 110. According to an embodiment of the present invention, the spreading codes may be different for each sub-carrier. According to another embodiment of the present invention the same spreading code may be used for each sub-carrier, in which case a single multiplier may be used to generate the spread symbols for all sub-carriers.

The modulator 106 may be implemented by multiplying (mixing) the spread symbols 110 by different sub-carrier frequencies 111 ($\omega_i$, i=1 ... N) using multipliers 112 to produce modulated sub-carriers 114. The sub-carrier frequencies are shown in FIG. 1 in a complex form, but real sub-carriers (sine or cosine) may also be used. The modulated sub-carriers 114 are then summed by summer 116 to produce a transmit signal 118 (X(n)). Although it is desirable that the sub-carrier frequencies are selected so that the sub-carriers do not overlap in frequency spectrum, this is not essential.

Figure 2:
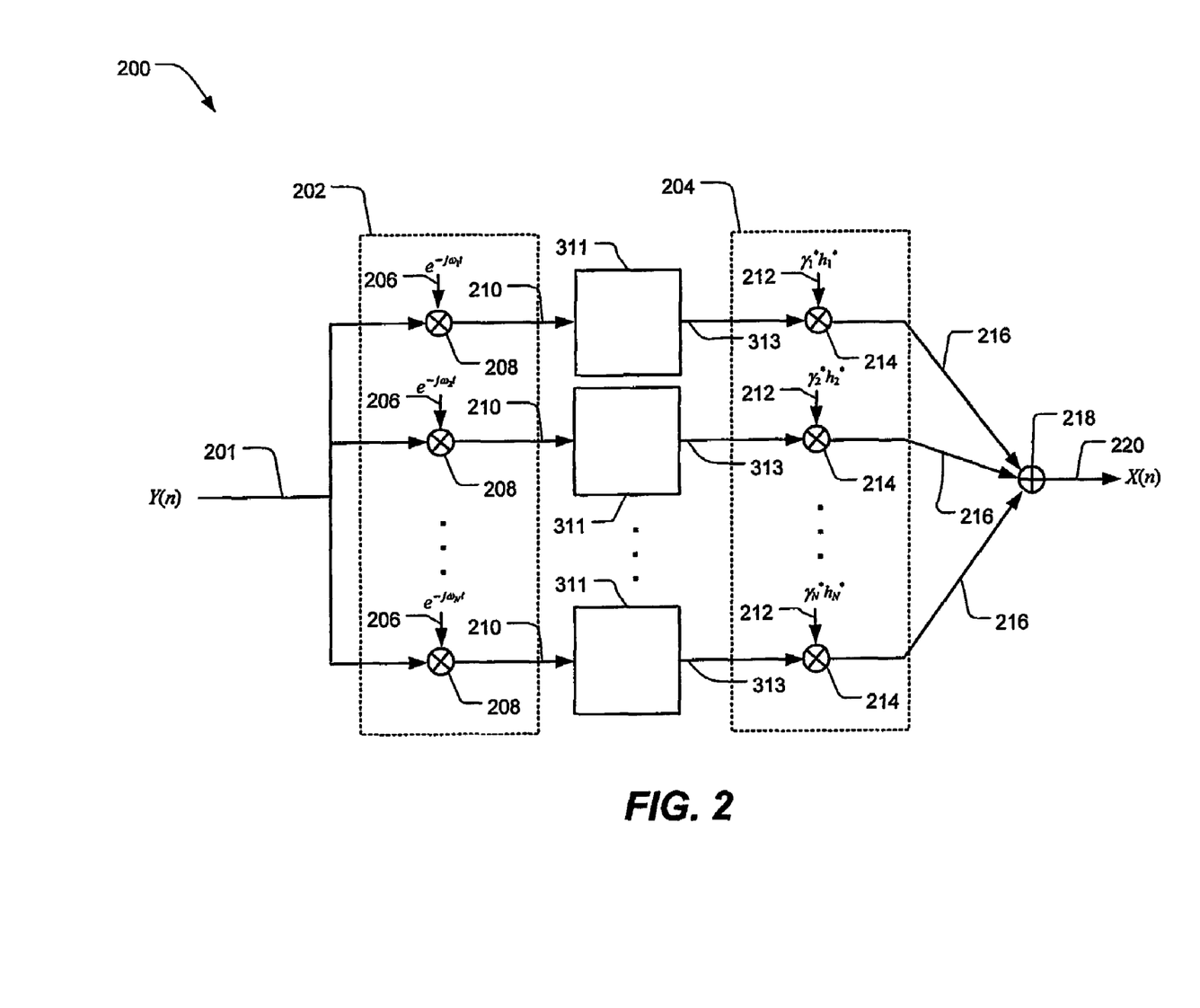
FIG. 2 is a schematic diagram of an embodiment of an MC-SS receiver in accordance with the present invention.

FIG. 2 illustrates a schematic diagram of an MC-SS receiver 200 for receiving received signal 201. The received signal 201 (Y(n)) may be the transmit signal 118 with or without noise, interference, and jamming superimposed. Various ways for communicating the transmit signal to the receiver are possible, including wireless and wired channels. For example, the received signal may be received over a radio link. The received signal may alternately be received through an optical fiber system or over a wire. The channel may cause distortion to the signal, resulting in different sub-channel gain $h_i$ for each of the sub-carrier bands.

The received signal 201 is separated into sub-carrier bands by a demodulator 202. According to an embodiment of the present invention, the demodulator 202 may be implemented by multiplying the received signal 201 by the complex conjugate of the sub-carrier frequencies 206 using multipliers 208 to produce demodulated sub-carrier bands 210.

The demodulated sub-carrier bands can be processed by non-linearity 311 to produce modified sub-carrier bands 313. The modified sub-carrier bands 313 can then be despread by despreader 204 and combined by summer 218. It is not essential that the form of the non-linearity 311 is identical for all N sub-channels. Further discussion of the non-linearity is provided below.

According to one embodiment of the present invention, the despreader may be implemented by multiplying the modified sub-carrier bands 313 by the conjugate spreading codes 212 ($\gamma_i^*$, i=1 ... N) using multipliers 214 to produce sub-channel soft symbols. 216. The despreader may also include the conjugate channel gains $h_i^*$ in the multiplication. Alternately, multiplication by the conjugate channel gains be performed by a separate multiplier (not shown). Multiplication by the conjugate channel gains may serve to phase align the sub-channels as is discussed further below.

The soft symbols are referred to as such because they represent a tentative estimate of the information symbols at the transmitter. Rather than making a "hard" (final) decision of the information symbol, a "soft" (tentative) estimate of the information symbols is made, carrying a confidence associated with it (e.g., a weighted value between zero and one is assigned, where zero represents no confidence and one represents highest confidence).

The conjugate spreading codes may be formed by taking the complex conjugate of the spreading codes 107 ($\gamma_i$). Generally, the spreading codes are chosen to have a magnitude of 1 hence, the despreader removes the spreading (since the product of the spreading code by its complex conjugate is equal to one). Of course, various other spreading codes may be chosen, and the spreader and despreader modified accordingly as will occur to one of skill in the art.

The despreading may be performed at various other points in the receiver. For example, in accordance with an embodiment of the present invention, the multiplication by conjugate spreading codes 212 may be combined with the demodulator 202.

Figure 3:
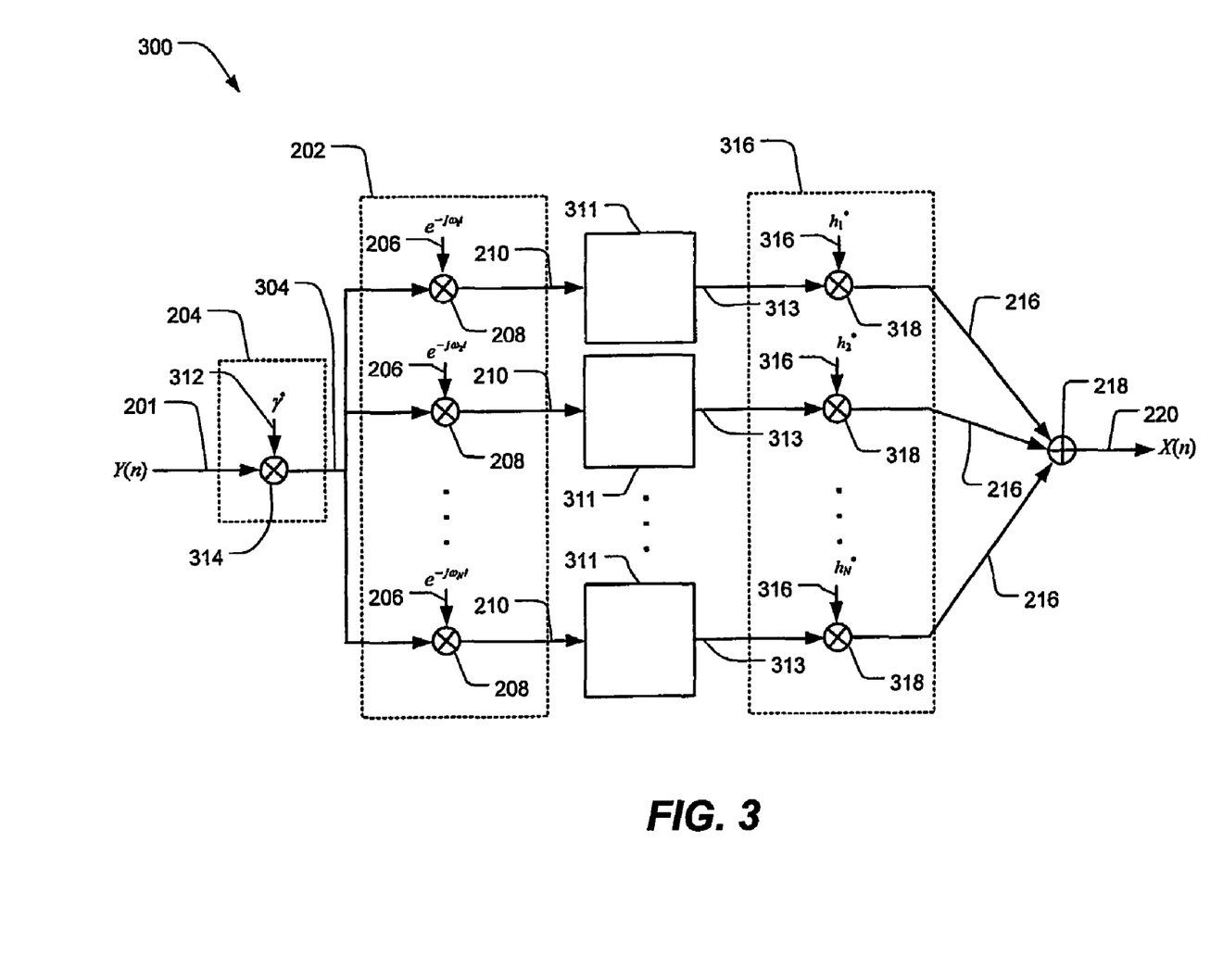
FIG. 3 is a schematic diagram of an alternate embodiment of an MC-SS receiver in accordance with the present invention.

In accordance with another embodiment of the present invention, the spreading codes $\gamma_i$ may be chosen to be the same for all sub-carriers (i.e., $\gamma_i=\gamma$ for i=1 ... N). In such a case, a rearranged receiver 300 may be used as illustrated in FIG. 3. In the rearranged receiver, the received signal 201 can be fed to despreader 204 to produce a despread signal 304. The despreader 204 may be implemented with a multiplier 314 to multiply the received signal by the conjugate spreading code 312. The despread signal can be fed into the demodulator 202 to produce demodulated sub-carrier bands 210.

The demodulated sub-carrier bands 210 may be fed through non-linearity 311 to produce modified sub-carrier bands 313. Sub-channel gains and phase alignment may be compensated for by multiplying the modified sub-carrier bands by the conjugate sub-channel gains $h_i^*$ using multipliers 318 to produce sub-channel soft symbols 216. The sub-channel soft symbols 216 can be summed with summer 218 to produce soft symbols 220. The soft symbols 220 may optionally undergo further processing, such as forward error correction decoding, according to other embodiments consistent with the present invention.

The non-linearity 311 eliminates the need for a sub-channel signal to noise ratio estimator as required by prior art MRC detectors. Although the non-linearity 311 may be omitted, such a receiver may only perform well if any noise and jamming/interference that may be present is uniform across the sub-channels. The non-linearity 311 can provide a performance improvement relative to a receiver omitting the non-linearity by suppressing jamming and interference signals. For example, when partial-band jamming is present, sub-carrier bands corrupted by jamming may have larger amplitudes than uncorrupted sub-carrier bands due to the additional noise caused by the jamming. The corrupted sub-carrier soft symbols 216 may thus dominate the resulting soft symbols 220. which can lead to reception errors. To compensate for partial-band jamming the non-linearity 311 can substantially equalize the amplitude of the sub-carrier bands 316, thus reducing the effects of partial band jamming. Since the modified sub-carrier bands can be approximately equal in magnitude, the jamming corrupted soft-symbols may not dominate the sum, reducing the likelihood of errors in the soft symbols 320.

The non-linearity 311 may also provide a similar performance improvement when the noise levels present in sub-carrier bands differ from each other. The non-linearity can reduce the influence of high noise sub-carriers and increase the influence of low noise sub-carriers on the resulting soft symbols 220, resulting in reduced likelihood of reception errors. Estimation of sub-channel SNR, as required by prior art MC-SS systems is therefore not required.

Non-linearity 311 may be implemented as an amplitude normalizer, according to an embodiment of the present invention. The amplitude normalizer can modify the sub-carrier bands 313 y(t) such that $$y(t)=x(t)/|x(t)| \tag{1}$$

where x(t) is the demodulated sub-carrier band 210. This particular embodiment of non-linearity 311 will now be discussed in mathematical detail to provide further understanding of the present inventive concepts.

The received spread spectrum signal may be modeled as:

$$r(n)=s(n)H\gamma(n)+v(n) \qquad (2)$$

where s(n) is the information symbol, H is a diagonal matrix with the channel gains for different sub-carriers, $\gamma(n)$ is a spreading vector, and v(n) is a vector of sub-channel noise plus interference/jammer, each at time n. Scalar variables are denoted by lower-case non-bold letters; lower-case bold is used to denote column vectors; and matrices are denoted by upper-case bold. The $i^{th}$ element of a vector x is denoted by $x_i$.

The spreading vector, $\gamma(n)$ is a vector of the spreading codes, comprised of the spreading codes $\gamma_i$ for each sub-channel, i =1 . . . N, $\gamma(n)=[\gamma_1(n)\gamma_2(n) \ldots \gamma_N(n)]^T$, where a superscript T denotes the transpose operator. As noted above, the spreading codes may be identical for all the sub-channels, or different spread codes may be used for some or all of the channels.

Equation (2) may be rearranged to form $$r'(n)=s(n)u+v'(n) \qquad (3)$$

where u is a vector of length N with elements of 1, and $$r'(n)=(H\Gamma(n))^{-1}r(n), \qquad (4)$$

$$v'(n)=(H\Gamma(n))^{-1}v'(n), \text{ and} \qquad (5)$$

$\Gamma(n)$ is a diagonal matrix whose diagonal elements are the elements of $\gamma(n)$.

It can be shown by using a constrained minimization and the method of Lagrange multipliers that an optimized set of weights for combining the sub-carrier bands is given by the weight vector $$w_o = \frac{1}{u^T R_{v'v'}^{-1} u} R_{v'v'}^{-1} u \qquad (6)$$

where $R_{v'v'}=E\lfloor v'(n)v'^T(n)\rfloor$, where E[·] is the statistical expectation operator and a superscript H denotes a Hermitian transpose.

As can be seen from equation (6), the optimal weighting requires knowledge of the statistics of the noise and interference/jammer $R_{v'v'}$ as well as the sub-channel gains H. Estimation of the sub-channel gains (diagonal elements $h_i$ of matrix H) is generally possible, particularly when the channel gain varies slowly in time. Various methods for estimating the sub-channel gains are known in the art. Estimation of the noise and interference/jammer statistics, on the other hand, is difficult to obtain in most situations. Furthermore, any errors in the estimation of the statistics can result in deviation from optimum performance.

Near optimal performance may be provided by including the non-linearity 311. For example, when the non-linearity is an amplitude normalizer, as given by equation (1), the elements of the sub-channels after normalization are given by $$\tilde{r}_i(n) = \frac{r'_i(n)}{|r'_i(n)|}, \qquad (7)$$

and the resulting soft symbols, after combining, are given by $$\tilde{s}_{subo}(n) = \sum_{i=0}^{N-1} |h_i| \tilde{r}_i(n) \qquad (8)$$

Upon substituting equations (4) and (7) into (8), yields $$\tilde{s}_{subo}(n) = \sum_{i=0}^{N-1} |h_i| \frac{\frac{r_i(n)}{h_i \gamma_i(n)}}{\left|\frac{r_i(n)}{h_i \gamma_i(n)}\right|},$$

which can be simplified in light of the identity $$\frac{\frac{a}{b}}{\left|\frac{a}{b}\right|} = \frac{ab^*}{|ab^*|} \text{ to yield} \qquad (9)$$

$$\tilde{s}_{subo}(n) = \sum_{i=0}^{N-1} |h_i| \frac{r_i(n) h_i^* \gamma_i(n)^*}{|r_i(n) h_i^* \gamma_i(n)^*|}. \qquad (10)$$

Practically speaking, the multiplication by h* serves to compensate for phase error which may be introduced between the sub-channels by the channel, and the multiplication by $\gamma^*$ serves to remove the spreading introduced by the transmitter. In practice, the receiver may estimate the channel gains, and thus provide a multiplication by an estimated h*. Generally, the spreading codes are known to both the transmitter and receiver, although in some applications the receiver may also estimate the spreading code as well. The division by $|r_i(n)h_i^*\gamma_i)^*|$ can provide the normalization (non-linearity). Finally, the weighting by $|h_i|$ approximates the weighting by signal to noise ratio the MRC combiner (e.g. equation (6)) would provide, but without the complexity of estimating the SNR.

Equation (10) may be further simplified as $$\tilde{s}_{subo}(n) = \sum_{i=0}^{N-1} h_i^* \gamma_i(n)^* \frac{r_i(n)}{|r_i(n)|}. \qquad (11)$$

assuming that $|\gamma_i|=1$, and noting that $|h_i|=h_i^*|$. This embodiment of this invention is illustrated in FIG. 2.

Figure 4:
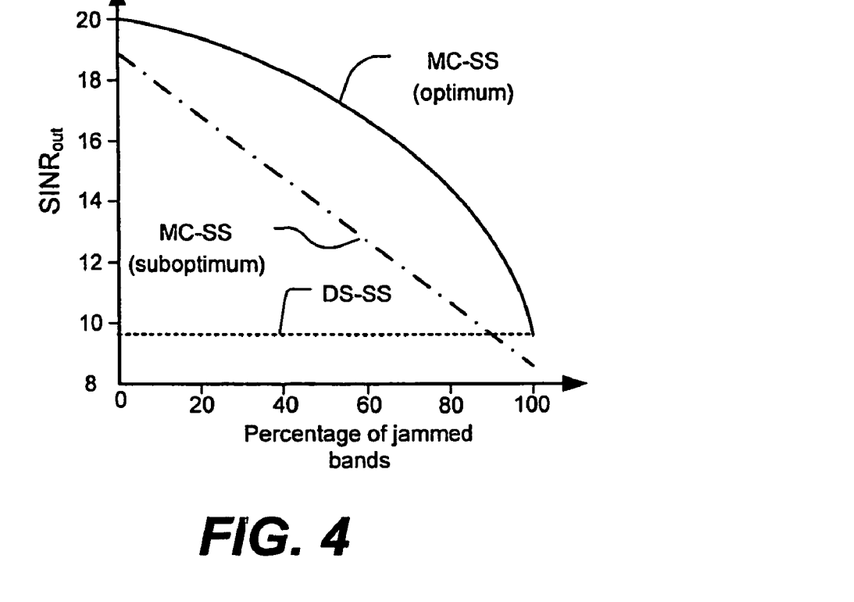
FIG. 4 is a graph of the performance of the receiver of FIG. 2 compared to direct sequence spread spectrum and optimal multi-carrier spread spectrum systems.

FIG. 4 illustrates the performance of the amplitude normalizer. The x axis shows the percentage of the sub-channels which are jammed. The y axis shows the signal to noise-plus-interference ratio (SINR) out of the combiner. The results for the receiver 200 using an amplitude normalizer (soft symbols determined according to equation (10)), is shown along with comparison curves for an optimal combiner (combining with weights according to equation (6)), and a direct sequence spread spectrum system (i.e., without multiple sub-channels). All three systems are assumed to occupy the same bandwidth, and the total power of the jammer is 10 dB above the noise level. It can be seen that the amplitude normalizer provides most of the improvement of the optimum combiner relative to conventional direct sequence spread spectrum, losing only 1 to 2 dB when jammer occupy a small percentage of the SS band. Of course, other operating scenarios will result in differing performance, but losses of only a few dB relative to the optimum combiner have been observed in most cases.

Figure 5:
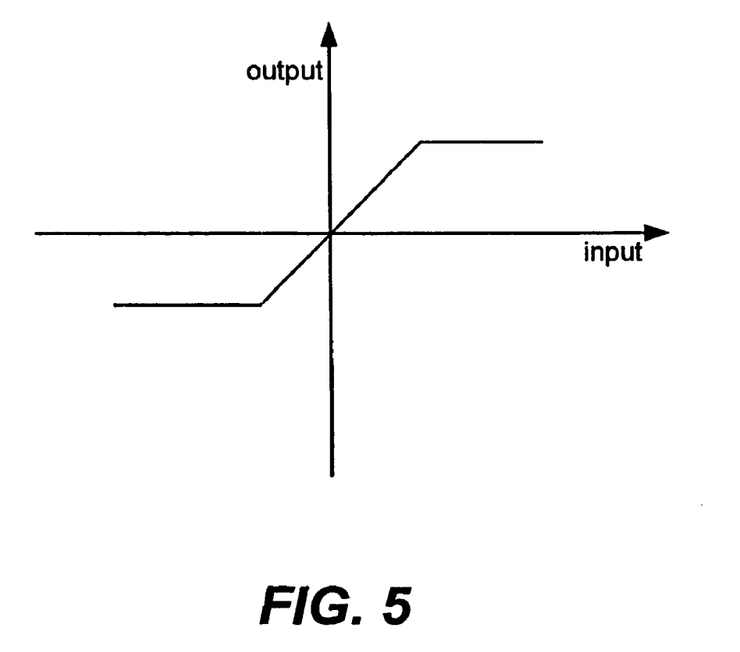
FIG. 5 is a graph of the input-output response of an exemplary non-linearity for the MC-SS receivers of FIGS. 2 and 3.

Various other forms for non-linearity 311 may be used in accordance with the present invention. For example, any non-linearity which provides a normalizing effect may reduce the contribution of high amplitude (e.g. jammed or high noise) sub-channels to the soft symbol, and thus provide a performance benefit similar to that obtained by the amplitude normalizer. For example, the non-linearity may be implemented as a limiter as shown in FIG. 5. In accordance with another embodiment of the present invention, the characteristics of the limiter, such as the limiting value, may be adjusted based on the channel gins (cnown or estimated).

The non-linearity may also be implemented as a logarithmic scaling function, e.g. sing a log amplifier. Alternately, the non-linearity may be implemented as an $n^{th}$ root scaling fimction, e.g. using a square root amplifier or cascade of such amplifiers. Various other embodiments of non-linearity 311 consistent with the present invention will be apparent to one of ordinary skill in the art and in possession of this disclosure.

During operation of the receiver, the conjugate spreading codes 212 (FIG. 2) are approximately time synchronized with the transmitted spreading codes 107 (FIG. 1) while accounting for propagation delay to allow recovery of the information symbols. Various approaches for accomplishing code synchronization are known in the art. Once the receiver 300 obtains timing synchronization, it is possible to extract ranging information using various techniques known in the art. Additionally, receiver 300 may be used to extract range information from the sub-channel gains, $h_i$, if known, by using the sub-channel gains as an estimate of the channel frequency response, and performing an inverse transform of the channel frequency response to obtain the channel impulse response and resulting delay. This ranging information may then advantageously be applied in determining distance between the transmitter and receiver. This can be beneficial, for example, for position location. Ranging information can also be used to detect distance or length from a single end measurement (where transmitter and receiver are in the same location), for use in collision avoidance or other radar application and for fault location on a wire.

Figure 6:
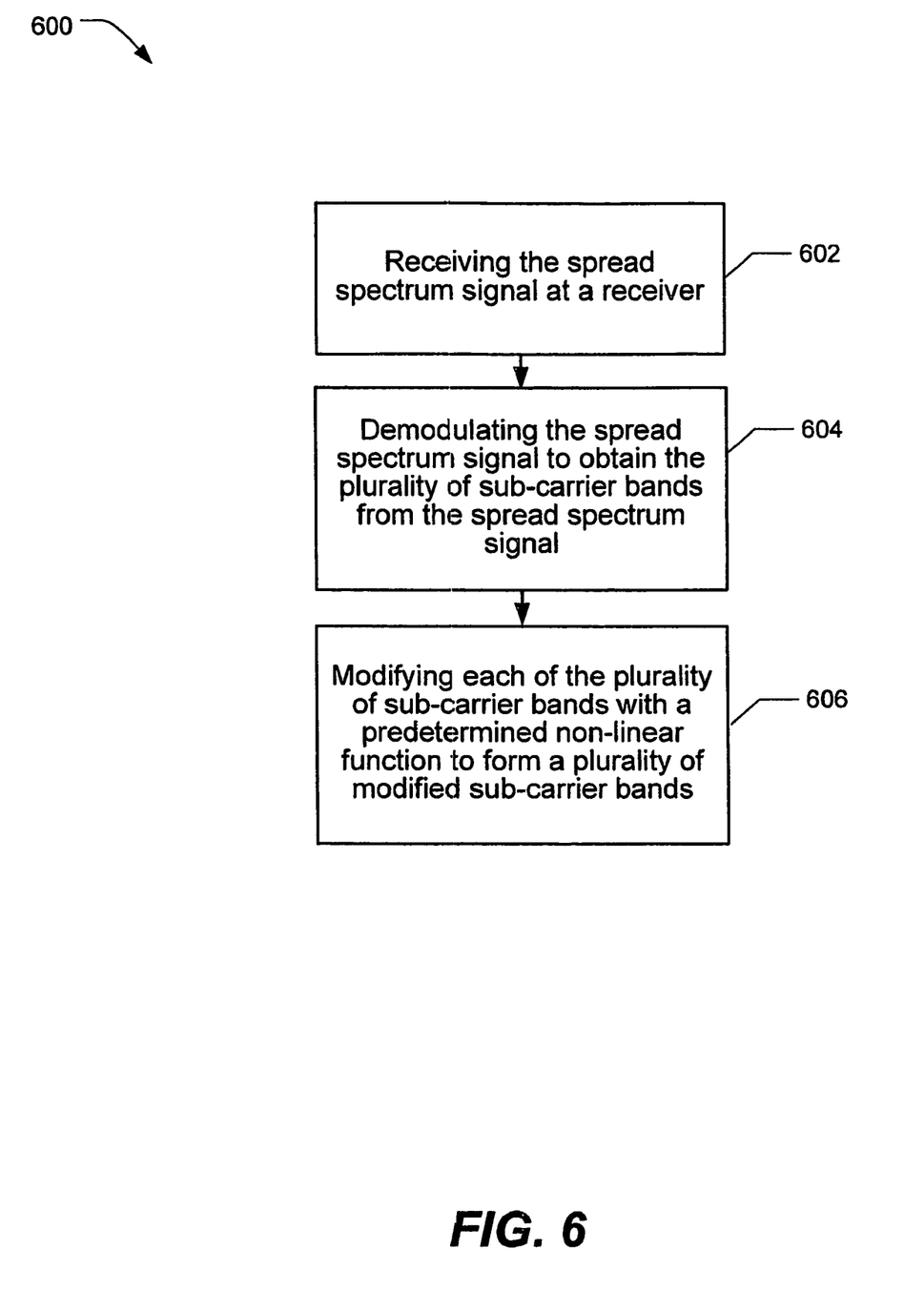
FIG. 6 is a flow chart of a method for processing a spread-spectrum multi-carrier signal in accordance with an embodiment of the present invention

According to another embodiment of the present invention, a method for processing a spread spectrum signal is illustrated in flowchart form in FIG. 6. The method 600 may be applied to a spread spectrum signal having a plurality of sub-carrier bands with each of the plurality of sub-carrier bands having substantially similar information encoded therein. The method may include receiving 602 the spread spectrum signal at a receiver. The method may also include demodulating 604 the spread spectrum signal. Demodulating the spread spectrum signal may be performed to obtain the plurality of sub-carrier bands. The method may also include modifying 606 at least one of the plurality of sub-carrier bands with a predetermined non-linear function to form a plurality of modified sub-carrier bands. The predetermined non-linear function may reduce the high amplitude of jammed sub-carrier bands, to reduce the effects of jamming, as discussed above.

Figure 7:
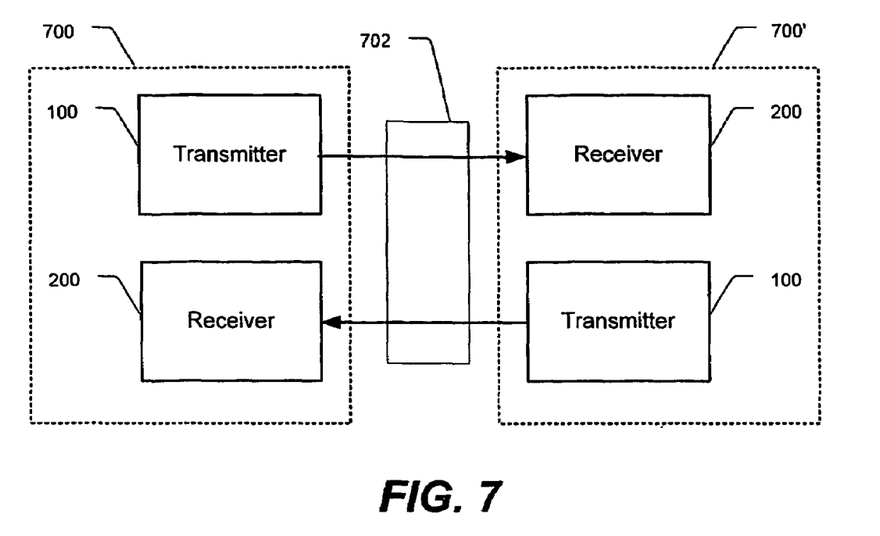
FIG. 7 is an illustration of a pair of MC-SS transceivers in accordance with an embodiment of the present invention.

In accordance with another embodiment of the present invention, a transceiver 700 is illustrated in FIG. 7. The transceiver may include a transmitter 100 and a receiver 200. The transceiver may be in communication with another transceiver 700' through a channel 702 (e.g. a wireless or wired channel), or the transceiver may be used as a radar as discussed further below.

Figure 8:
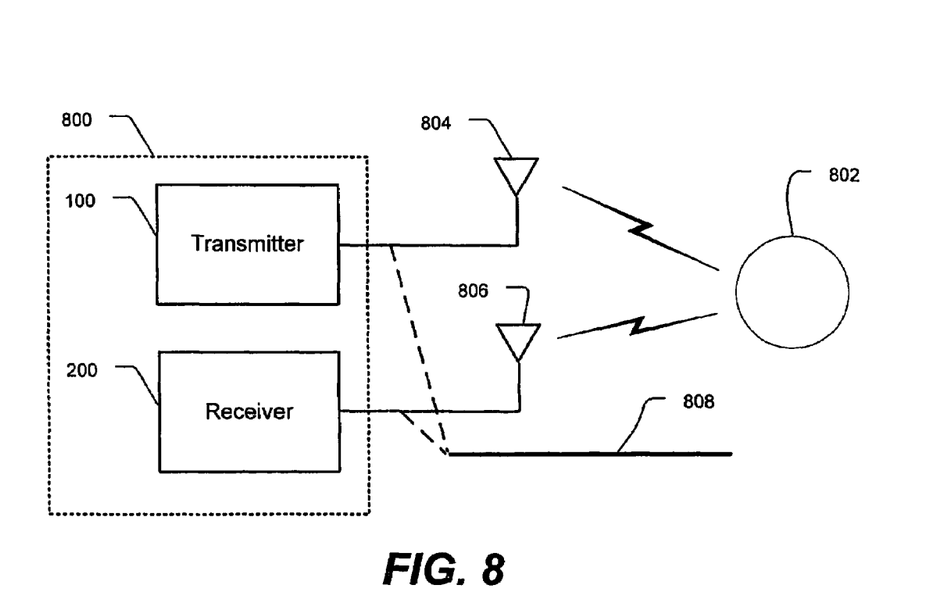
FIG. 8 is an illustration of an MC-SS transceiver configured to operate as a radar in accordance with an embodiment of the present invention.

According to another embodiment of the present invention, MC-SS radar 800 may be implemented by combining the transmitter 100 and the receiver 200 into a single unit as illustrated in FIG. 8. The transmitted signal 118 is reflected back to the receiver 200 by a reflecting surface or object 802. Antennas 804, 806 may be included on both the transmitter 100 and receiver 200, or the transmitter and receiver may be coupled directly to a wire 808. Use of MC-SS radar provides advantages over conventional spread-spectrum radar in that greater immunity to partial band jamming and non-white noise may be obtained. Additionally, MC-SS radar may be less affected by variations in the frequency response of the reflecting surface that could cause disruption relative to conventional spread-spectrum radar. This may allow improved performance in radar applications such as distance estimation and material dielectric measurements.

Recapitulating to some extent, it has been shown how a non-linearity may be used in a spread spectrum multi-carrier receiver to reduce the effects of partial jamming and noise. The non-linearity may ameliorate the effects of jamming and interference. Unlike optimal combiners of the prior art, such as a maximum ratio combiner, no estimate of the signal to noise ratio or an estimate of the statistics of the noise, interference, or jamming is needed. Hence, a multi-carrier spread spectrum receiver using a non-linearity may be less complex than prior art receivers.

It is to be understood that the above-referenced arrangements are illustrative of the application for the principles of the present invention. Numerous modifications and alternative arrangements can be devised without departing from the spirit and scope of the present invention while the present invention has been shown in the drawings and described above in connection with the exemplary embodiments of the invention. It will be apparent to those of ordinary skill in the art that numerous modifications can be made without departing from the principles and concepts of the invention as set forth in the claims.

What is claimed is:

1. A method for processing a spread spectrum signal having a plurality of sub-carrier bands, with each of the plurality of sub-carrier bands having substantially similar information encoded therein, comprising:
   receiving the spread spectrum signal at a receiver;
   demodulating the spread spectrum signal to obtain the plurality of sub-carrier bands from the spread spectrum signal;
   modifying at least one of the plurality of sub-carrier bands with a predetermined non-linear function to form a plurality of modified sub-carrier bands; and
   summing the plurality of modified sub-carrier bands to obtain a combined signal.

2. A method as in claim 1, further comprising modifying each of the sub-carrier bands with a predetermined non-linear function to form a plurality of modified sub-carrier bands.

3. A method as in claim 1, further comprising despreading the plurality of modified sub-carrier bands.

4. A method as in claim 1, further comprising despreading the spread spectrum signal before demodulating the spread spectrum signal.

5. A method as in claim 1, further comprising phase-demodulating the combined signal with a phase detector configured to demodulate an M-ary phase shift key modulated spread spectrum signal to obtain an estimate of the information.

6. A method as in claim 1, wherein wherein the plurality of modified sub-carrier bands are substantially normalized, to produce a soft symbol signal.

7. A method as in claim 1, wherein modifying further comprises modifying at least one of the plurality of sub-carrier bands with an amplitude normalization function.

8. A method as in claim 1, wherein modifying further comprises modifying at least one of the plurality of sub-carrier bands with an amplitude limiting function.

9. A method as in claim 1, wherein modifying further comprises modifying at least one of the plurality of sub-carrier bands with an amplitude logarithmic scaling function.

10. A method as in claim 1, wherein modifying further comprises modifying at least one of the plurality of sub-carrier bands with an nth root amplitude scaling function, wherein n is greater than 1.

11. A method as in claim 10, further comprising modifying at least one of the plurality of sub-carrier bands with an nth root amplitude scaling function, wherein n is less than 20.

12. A method as in claim 1, further comprising estimating a plurality of channel gains corresponding to the plurality of modified sub-carrier bands to obtain estimated channel gains.

13. A method as in claim 12, further comprising adjusting a parameter of the predetermined non-linear function based on the estimated channel gains.

14. A method as in claim 12, further comprising:
   estimating a channel frequency response from the estimated channel gains; and
   inverting the channel frequency response to obtain an estimated channel delay.

15. A method as in claim 14, further comprising determining a distance between a transmitter and the receiver from the estimated channel delay.

16. A method as in claim 15, further comprising:
   placing the transmitter and receiver in a substantially similar location to form a spread spectrum multi-carrier radar;
   determining a time difference between a transmitted spread spectrum signal and receiving a reflected spread spectrum signal; and
   calculating a distance to an object from the time difference between the transmitted signal and the received signal.

17. A receiver configured to process a spread spectrum signal having a plurality of sub-carrier bands, with each of the sub-carrier bands having substantially similar information encoded therein, comprising:
   a demodulator configured to demodulate the spread spectrum signal and obtain the plurality of sub-carrier bands;
   a modifying module coupled to the demodulator and configured to modify at least one of the plurality of sub-carrier bands with a predetermined non-linear function to form a plurality of modified sub-carrier bands;
   a despreader coupled to the modifying module configured to despread the plurality of modified sub-carrier bands; and
   a summer coupled to the despreader and configured to sum the plurality of modified sub-carrier bands.

18. The receiver of claim 17 wherein the modifying module is further configured to modify each of the plurality of sub-carrier bands with a predetermined non-linear function.

19. A receiver configured to process a spread spectrum signal having a plurality of sub-carrier bands, with each of the sub-carrier bands having substantially similar information encoded therein, comprising:
   a despreader configured to despread the spread spectrum signal to obtain a despread spread spectrum signal;
   a demodulator coupled to the despreader and configured to demodulate the despread spread spectrum signal and obtain the plurality of sub-carrier bands;
   a modifying module coupled to the demodulator and configured to modify each of the plurality of sub-carrier bands with a predetermined non-linear function to form, a plurality of modified sub-carrier bands; and
   a summer coupled to the modifying module and configured to sum the plurality of modified sub-carrier bands.

20. The receiver of claim 19 wherein the modifying module is further configured to modify each of the plurality of sub-carrier bands with a predetermined non-linear function.

21. A transceiver system configured to process a spread spectrum signal, comprising:
   a transmitter configured to transmit a spread spectrum signal having a plurality of sub-carrier bands, with each of the sub carrier bands having substantially similar information encoded therein;
   a receiver in communication with the transmitter and configured to receive the spread spectrum signal sent by the transmitter;
   a demodulator coupled to the receiver and configured to demodulate the spread spectrum signal received by the receiver and obtain the plurality of sub-carrier bands; and
   a modifying module coupled to the demodulator and configured to modify each of the plurality of sub-carrier bands with a predetermined non-linear function.

22. A method for processing a spread spectrum signal having a plurality of sub-carrier bands, with each of the plurality of sub-carrier bands having substantially similar information encoded therein, comprising:
   receiving the spread spectrum signal at a receiver;
   demodulating the spread spectrum signal to obtain the plurality of sub-carrier bands from the spread spectrum signal;
   modifying at least one of the plurality of sub-carrier bands with a predetermined non-linear function to form a plurality of modified sub-carrier bands;
   summing the plurality of modified sub-carrier bands to obtain a combined signal; and
   phase-demodulating the combined signal with a phase detector configured to demodulate an M-ary phase shift key modulated spread spectrum signal to obtain an estimate of the information.

23. A method for processing a spread spectrum signal having a plurality of sub-carrier bands, with each of the plurality of sub-carrier bands having substantially similar information encoded therein, comprising:
   receiving the spread spectrum signal at a receiver;
   demodulating the spread spectrum signal to obtain the plurality of sub-carrier bands from the spread spectrum signal;
   modifying at least one of the plurality of sub-carrier bands with a predetermined non-linear function to form a plurality of modified sub-carrier bands; and
   estimating a plurality of channel gains corresponding to the plurality of modified sub-carrier bands to obtain estimated channel gains.

24. A method as in claim 23, further comprising adjusting a parameter of the predetermined non-linear function based on the estimated channel gains.

25. A method as in claim 23, further comprising:
   estimating a channel frequency response from the estimated channel gains; and
   inverting the channel frequency response to obtain an estimated channel delay.

26. A method as in claim 25, further comprising determining a distance between a transmitter and the receiver from the estimated channel delay.

27. A method as in claim 26, further comprising:
placing the transmitter and receiver in a substantially similar location to form a spread spectrum multi-carrier radar;
determining a time difference between a transmitted spread spectrum signal and receiving a reflected spread spectrum signal; and
calculating a distance to an object from the time difference between the transmitted signal and the received signal.

* * * * *

UNITED STATES PATENT AND TRADEMARK OFFICE
CERTIFICATE OF CORRECTION

| | | |
|---|---|---|
| PATENT NO. | : 7,634,012 B2 | Page 1 of 1 |
| APPLICATION NO. | : 10/558929 | |
| DATED | : December 15, 2009 | |
| INVENTOR(S) | : Farhang-Boroujeny et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1005 days.

Signed and Sealed this

Ninth Day of November, 2010

David J. Kappos
*Director of the United States Patent and Trademark Office*